May 20, 1958 G. F. DIXON, JR 2,835,016
CONCRETE MATTRESS MACHINE
Filed Nov. 6, 1953 9 Sheets-Sheet 1

INVENTOR.
GEORGE F. DIXON, JR.
BY
ATTORNEY

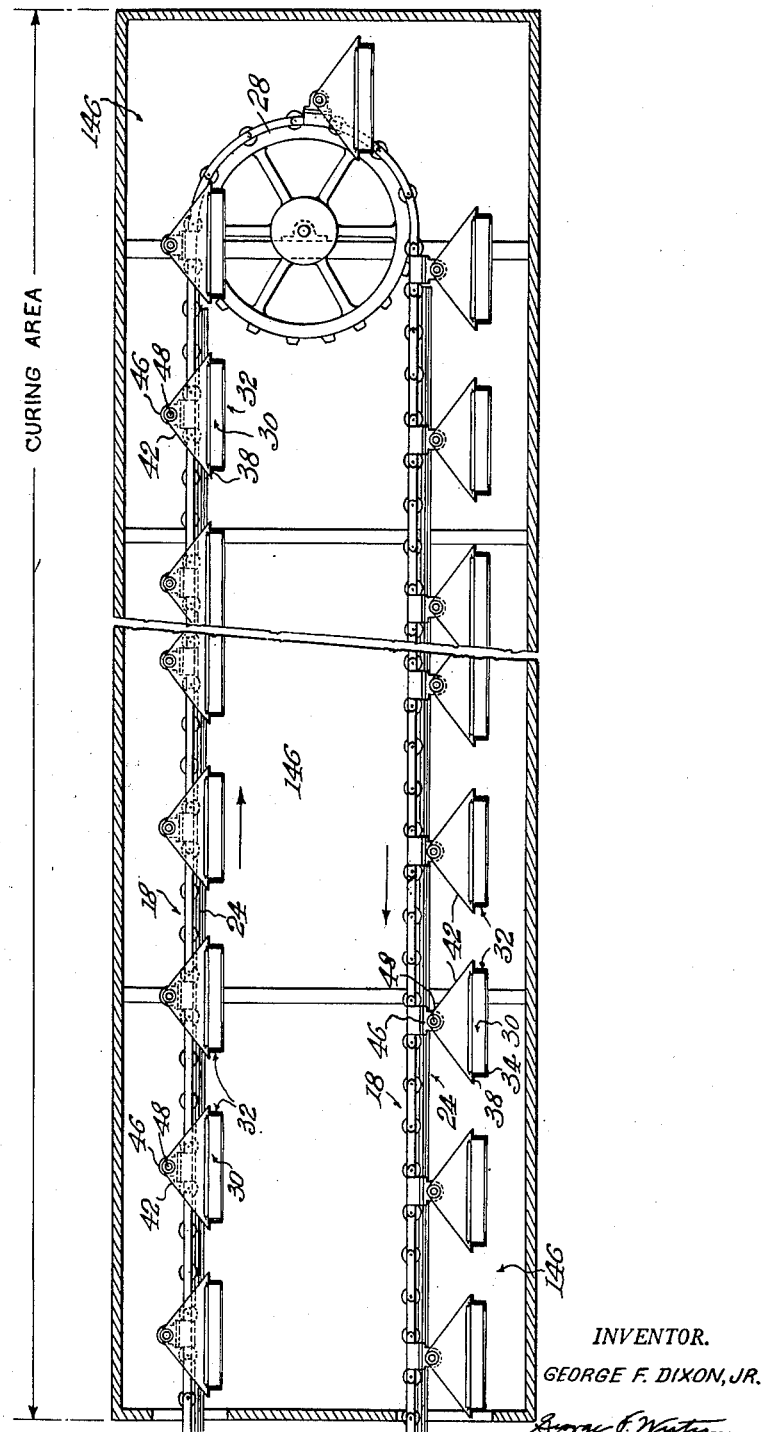

May 20, 1958   G. F. DIXON, JR   2,835,016
CONCRETE MATTRESS MACHINE
Filed Nov. 6, 1953   9 Sheets-Sheet 3

INVENTOR.
GEORGE F. DIXON, JR.
BY
ATTORNEYS

May 20, 1958 G. F. DIXON, JR 2,835,016
CONCRETE MATTRESS MACHINE
Filed Nov. 6, 1953 9 Sheets-Sheet 4

INVENTOR.
GEORGE F. DIXON, JR.

BY

ATTORNEYS

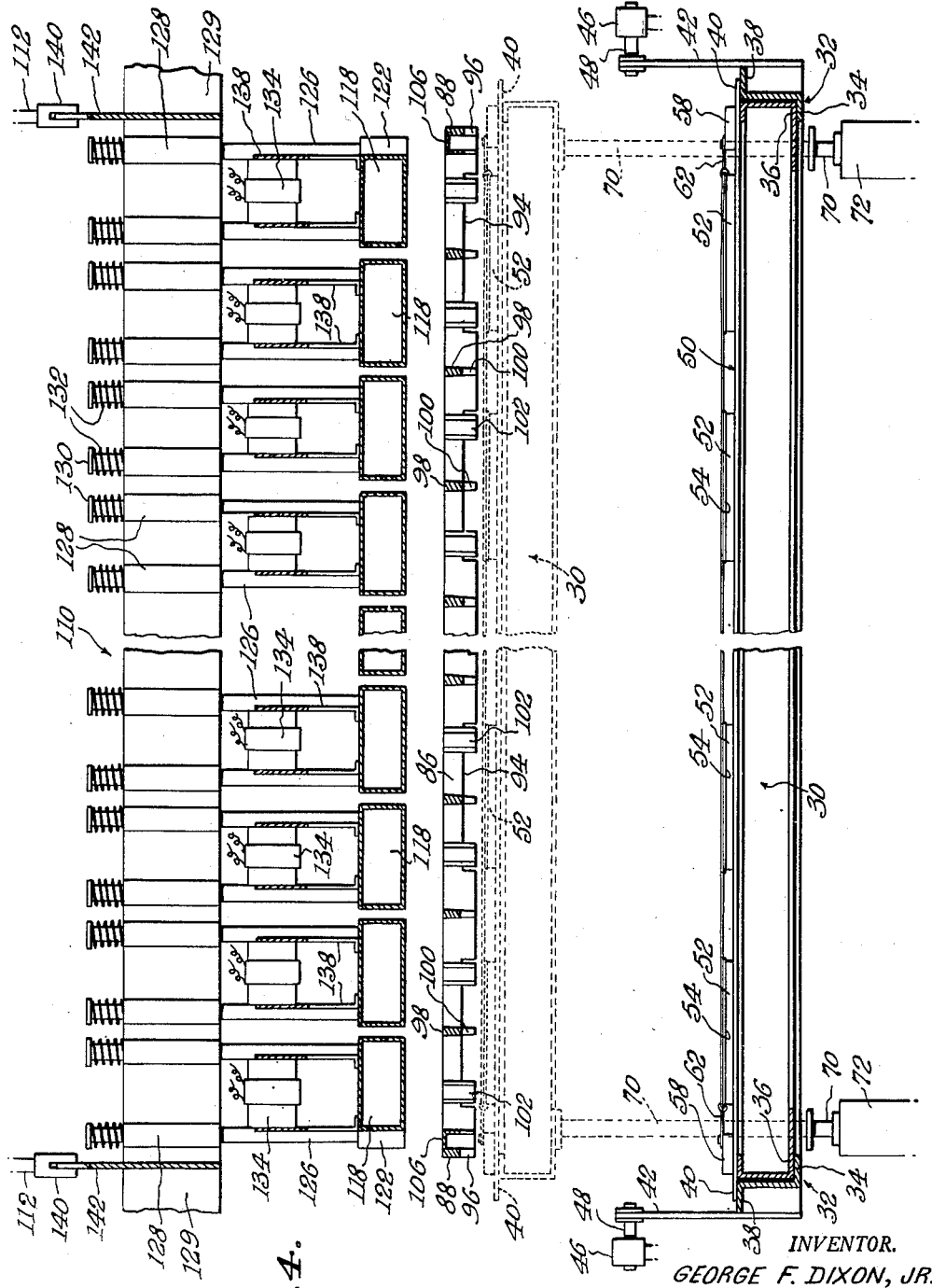

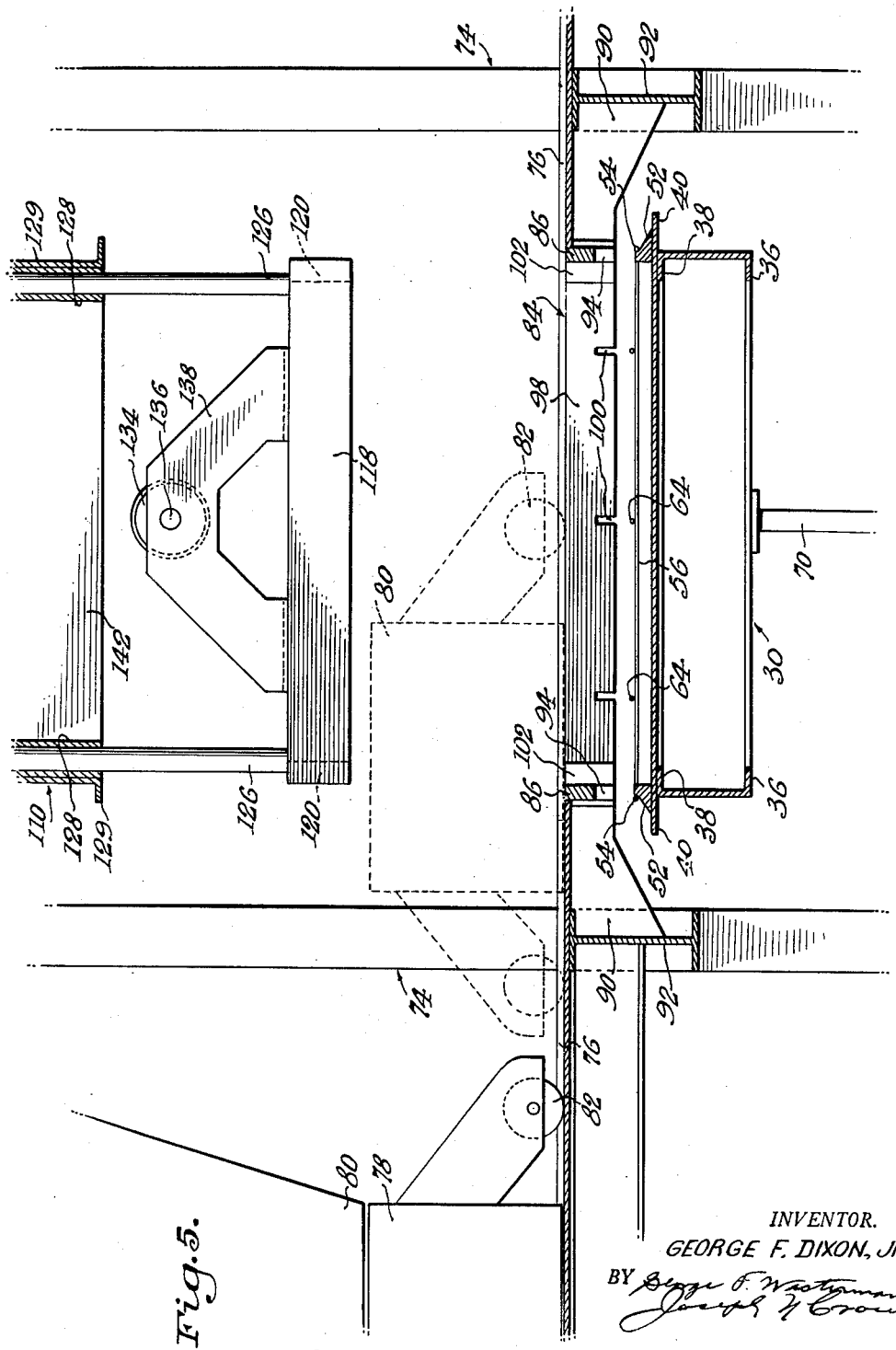

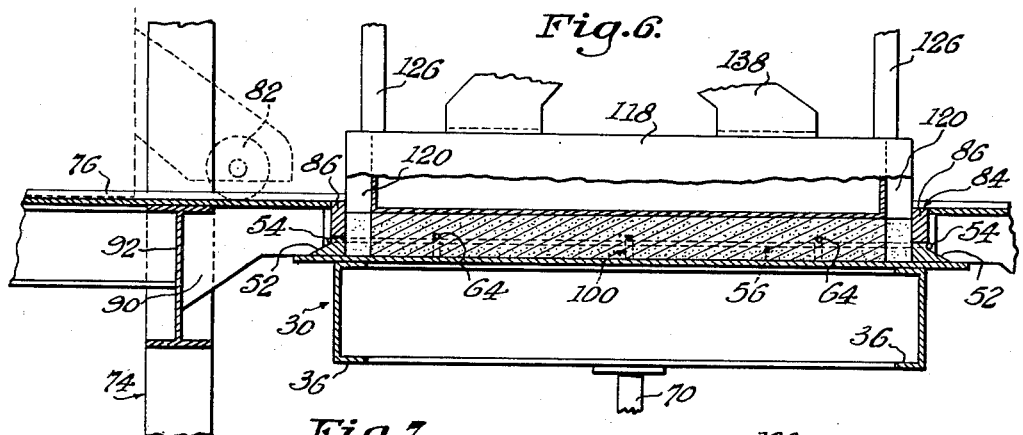
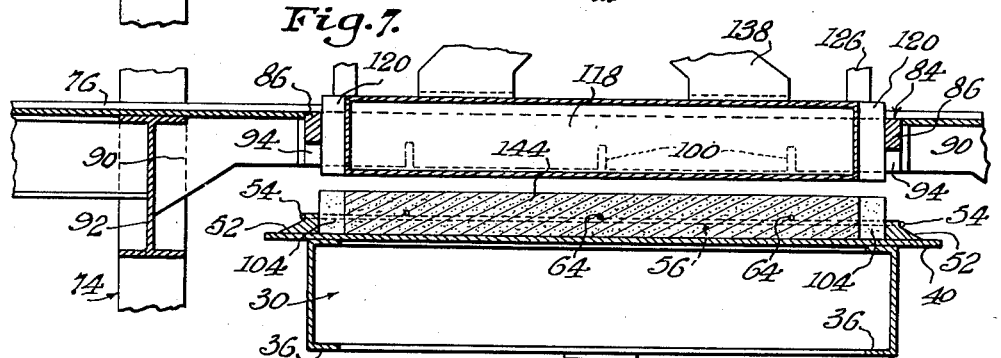
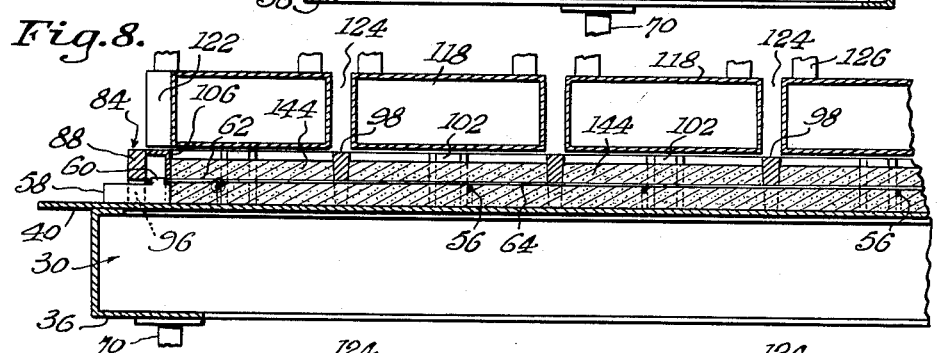
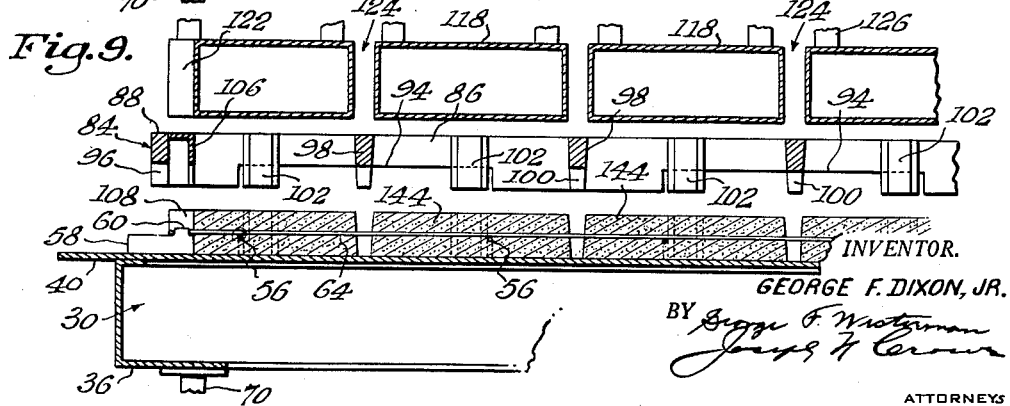

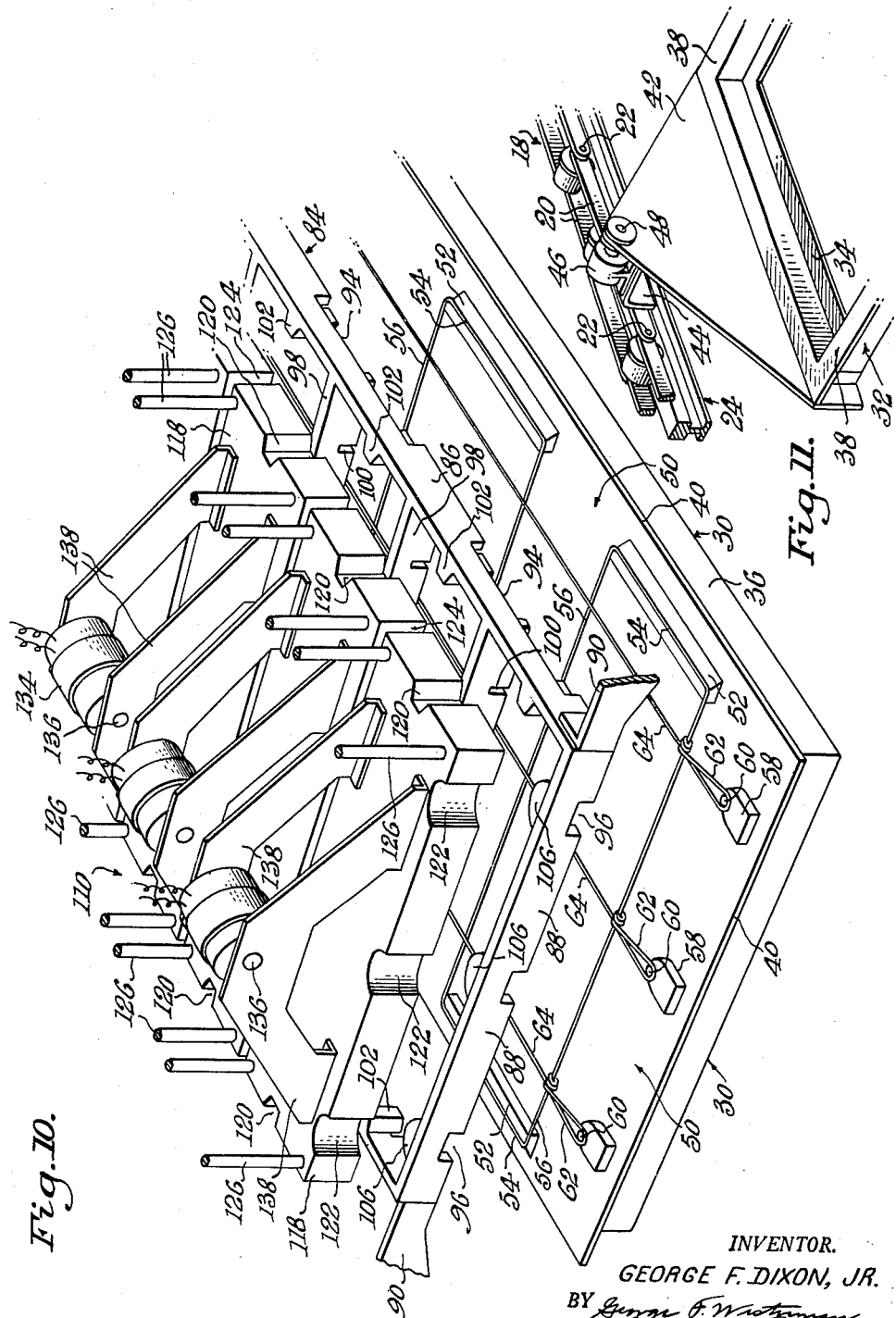

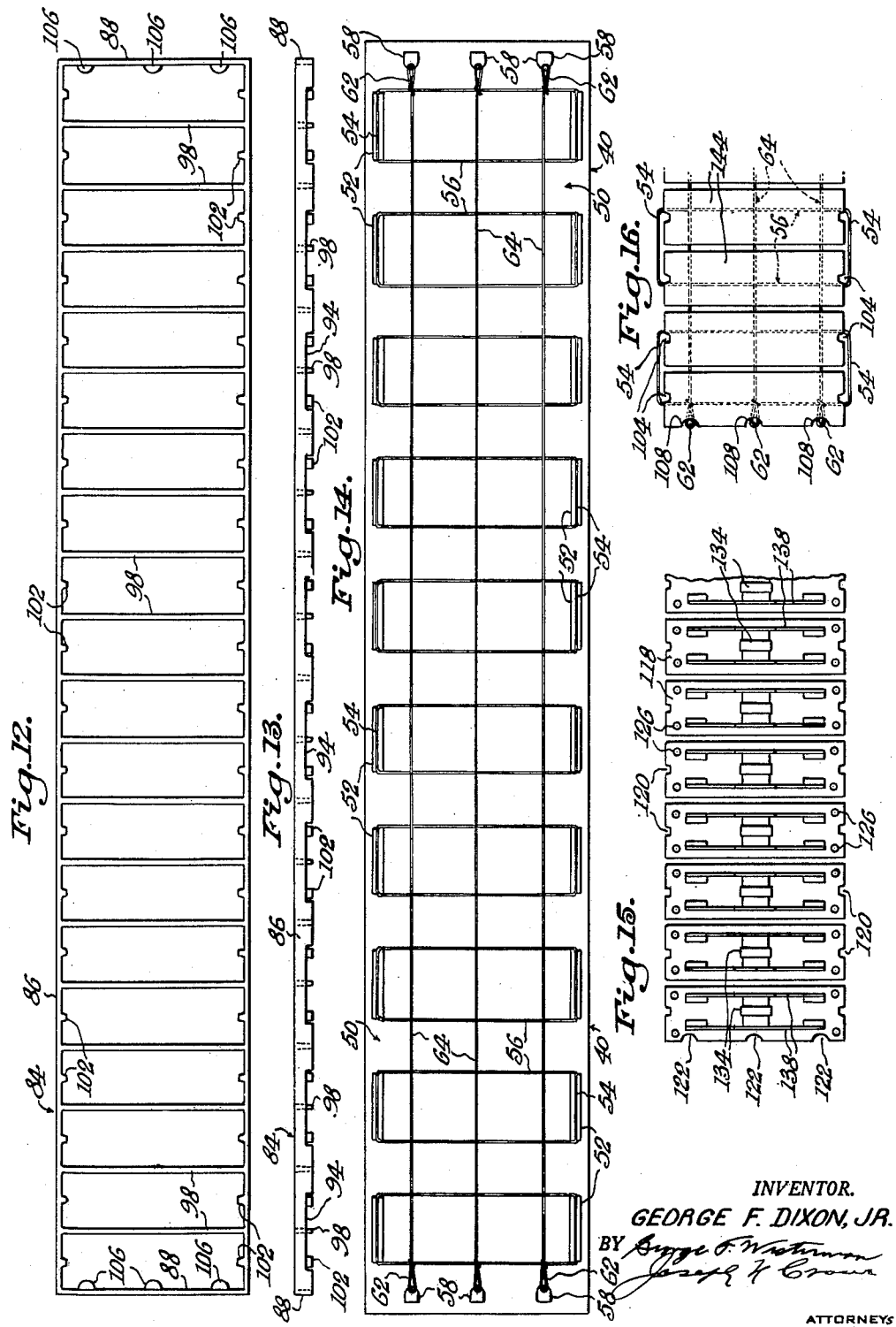

United States Patent Office 2,835,016
Patented May 20, 1958

2,835,016

CONCRETE MATTRESS MACHINE

George F. Dixon, Jr., United States Army, Vienna, Va.

Application November 6, 1953, Serial No. 390,764

6 Claims. (Cl. 25—2)

(Granted under Title 35, U. S. Code (1952), sec. 266)

The invention described herein may be manufactured and used by or for the Government for governmental purposes, without payment to me of any royalty thereon.

The present invention relates to improvements in the production of concrete revetment mats that are employed for the protection of flood control levees, river banks, shore lines, beaches, and the like, from erosion through the action of waves, river currents, weathering, and other erosive effects.

Such revetment mats usually are of the flexible type, being composed of a series of reinforced concrete slabs that are interconnected flexibly in both longitudinal and transverse directions. Generally speaking, these revetment mats when placed, constitute permanent installations. Therefore, they must be of sufficient weight to prevent displacement or dislocation through the actions of waves, currents, and winds, and they must be sufficiently flexible in all directions to enable them to be self-accommodating to irregularities of the river bottom and shore line.

Such flexible revetment mats comprise a plurality of interconnected flexible sections or "squares," which are built up to the requisite length and width by flexibly interconnecting thereto similar flexible sections in side-by-side and end-to-end relation. Each of these squares is composed of concrete blocks or slabs, generally rectangular in shape, which are interconnected by flexible, reinforcing cables that form flexible hinge connections between the blocks. When the blocks are assembled into squares and the squares interconnected in end-to-end and side-by-side relation, a revetment is formed of any necessary length and width, and which is sufficiently flexible to permit considerable bending or flexure of the mat in both directions, thus enabling the mat to conform to the irregularities of the bank or beach, and assuring complete coverage thereof. In practice, each of the aforesaid squares is composed usually of twenty flexibly interconnected blocks or slabs, each of which is about three inches thick by fourteen and three-fourth inches wide, and three feet ten and one-fourth inches long, the long dimensions of the blocks being disposed transversely of the square, which measures usually three inches in thickness, three feet ten and one-fourth inches wide and twenty-four feet eleven and one-half inches long, there being open spaces between consecutive blocks one and five-eighths inches wide by three inches deep. These measurements are to be regarded as being only approximate, and are noted by way of illustration only. The whole structure is reinforced and bound together by a continuous structure of wire fabric located in a plane approximately midway between the top and bottom surfaces of the square. The open spaces between the blocks are left to provide necessary flexibility between the blocks to permit the mat to be launched from the launching plant, and to render the mat self-accommodating to irregularities in the underlying surface. When the mat squares are assembled on the sinking or launching platform and sunk as revetment, or placed on a bank as paving, open spaces one and three-fourths inches wide are left between longitudinal edges of consecutive squares. This construction provides openings through which the squares may be connected together and to the launching cables between them to form the revetment. The launching cables are required to support the weight of the squares while they are being launched from the sinking plant and sunk to the river bed. The usual manner of producing the standard type of revetment mat is to cast them in stacks with one square upon another and with paper separators between them. When the concrete poured into a form has set sufficiently, the form is lifted off vertically and the paper separators are spread over the square. The form then is reset on the paper and again is filled with concrete. The slabs are cast with suitable recesses affording access to the reinforcing wires for enabling insertion of a lifting tool and for tying together corresponding wires of adjacent slabs and sections.

The production of the revetment mats as carried out in accordance with usual practice involves the employment of considerable amounts of manual labor, and since the operations are carried on out of doors, weather conditions are important factors in the production of the mats. Also, the usual procedure involves the use of large amounts of cement for each square, and because of the fluidity of the concrete mix required for uniform spreading thereof throughout the assembled mold forms, considerable time is required for the slabs to acquire a sufficient amount of initial set to enable the transfer of the squares from the production site to storage.

An important object of the present invention is to provide an improved plant lay-out for producing revetment mat squares entirely mechanically, there being employed machine operations throughout, independently of weather conditions, and requiring only a minimum of manual labor. The present invention also permits a very substantial reduction in the amount of cement required per mat square that is required by the usual operations, but with the obtaining of the requisite strength in the slabs composing the squares.

A further object of the invention is the development of high early strength concrete mats, wherein the high early strength is obtained by means of low water-cement ratios, external vibration, and steam curing. The present invention provides mechanical equipment whereby articulated concrete mat squares, as are used for bank protection purposes to prevent steam erosion, can be machine-cast on a production line basis and steam-cured to the extent that the mat has sufficient strength for it to be handled and placed in storage position without being damaged.

Further objects of the invention will become apparent as the description proceeds and the features of novelty will be pointed out in particularity in the appended claims.

The invention will be understood by reference to the accompanying drawings, in which:

Figs. 1 and 1a, taken together, represent a side elevation of apparatus suitable for the mechanical production of flexible revetment mat squares, the portion of the equipment illustrated in Fig. 1a being shortened by breaking away a portion of the length thereof;

Fig. 2 is a plan view of a portion of the equipment shown in Fig. 1, the view showing a group of pallet-holding frames, the top half of the view showing in succession as viewed from the left, an empty pallet mounted in its frame, two pallets with reinforcing fabric for the mat squares, a pallet raised from its frame and shown in dotted lines, and a fragment of a mat square on its pallet, the bottom half of the view indicating a series of empty pallet-receiving frames;

Fig. 3 is a transverse vertical section taken on the line 3—3 of Fig. 1, looking in the direction of the arrows;

Fig. 4 is an enlarged transverse vertical section, somewhat similar to Fig. 3, except that fragments of the assembly as shown in Fig. 3 have been broken out to shorten the view, the view of Fig. 4 showing in section the pallet-holding frame, the pallet, the mold box and the tamping means, all of these elements being shown in section, the view also showing in full lines a pallet with the reinforcing fabric in position thereon, the pallet itself being shown in its frame, the dotted lines in the view indicating the pallet and frame raised to a position beneath, but adjacent to, the mold box preparatory to its assuming its position for receiving the concrete to be molded;

Fig. 5 is an enlarged detail section of the concrete pouring station shown in Fig. 1, the view showing a pallet and pallet-carrying frame raised into position under the mold box to receive the concrete mix from the spreader-hopper, the view also indicating in dotted lines the spreader-hopper moved into a position relative to the mold box for starting the filling of the mold box with concrete and spreading of the concrete through the mold box;

Fig. 6 is a view similar to Fig. 5, the view showing the pallet in position beneath the mold box which has been filled with concrete and which is indicated in the view as being subjected to a tamping operation by mechanical tamping means;

Fig. 7 is a view similar to Fig. 6, but with the pallet and pallet-carrying frame lowered from the mold box and the molded concrete in position on the pallet, the view showing the tamping means in final position incident to release of the molded mat square from the mold box;

Fig. 8 is a fragmentary detailed longitudinal section through one end of the pallet, pallet-carrying frame, mold box and tamping means, the view showing the concrete in the mold box prior to release therefrom, the tamping means being shown raised out of engagement with the concrete at the termination of the tamping operation;

Fig. 9 is a fragmentary view similar to Fig. 8, but showing the parts of Fig. 8 separated sufficiently for the molded mat square to have been released from the mold box and resting on its pallet;

Fig. 10 is a fragmentary detailed perspective view showing the pallet with reinforcing fabric in position thereon, the mold box and tamping means, the parts being shown in separated position for clarity;

Fig. 11 is a fragmentary perspective view of a pallet-carrying frame showing a pivotal connection thereof to a conveyor chain;

Fig. 12 is a plan view of a mold box;

Fig. 13 is a side elevation thereof;

Fig. 14 is a detailed plan view of a pallet showing the reinforcing fabric in place thereon;

Fig. 15 is a fragmentary top plan view of the tamping means; and

Fig. 16 is a top plan view of a portion of a revetment mat square produced in the present equipment.

The equipment illustrated in the accompanying drawings comprises generally endless conveyor means carrying equally spaced frames, each of which carries a pallet that cooperates with a mold box which will form a complete revetment mat square composed of twenty individual concrete slabs flexibly interconnected and reinforced by a reinforcing fabric composed of flexible longitudinal and transverse reinforcing wires that are suitably interconnected, the transverse reinforcing wires defining endless loops, the legs of which extend through adjacent slabs and the ends of which project beyond the ends of the slabs, to enable tying the said ends to similar end portions of the endless loops of an adjacent mat square for building up an assembly of mat squares of a desired surface area. The reinforcing fabric therefore ties together adjacent slabs of a mat in pairs, the exposed loop portions being flexible; and the longitudinally extending strands also being flexible, free flexibility between the individual slabs of a given mat square is attained. The pallets employed in the present equipment are dimensioned to correspond to a complete mat square, so that as each pallet comes into position beneath the fixed mold box at the concrete spreading station, a complete mat square will be cast. The reinforcing fabric is prefabricated in dimensions corresponding to the dimensions of each pallet, so as to interfit therewith in proper position as the fabric is placed on the respective pallets. The conveyor means is stopped in the actuation thereof as each pallet comes into registry with the fixed mold box, there resulting a completely molded mat square on each pallet. The operation of the improved system of the present invention will become apparent as the description proceeds.

Figure 1:
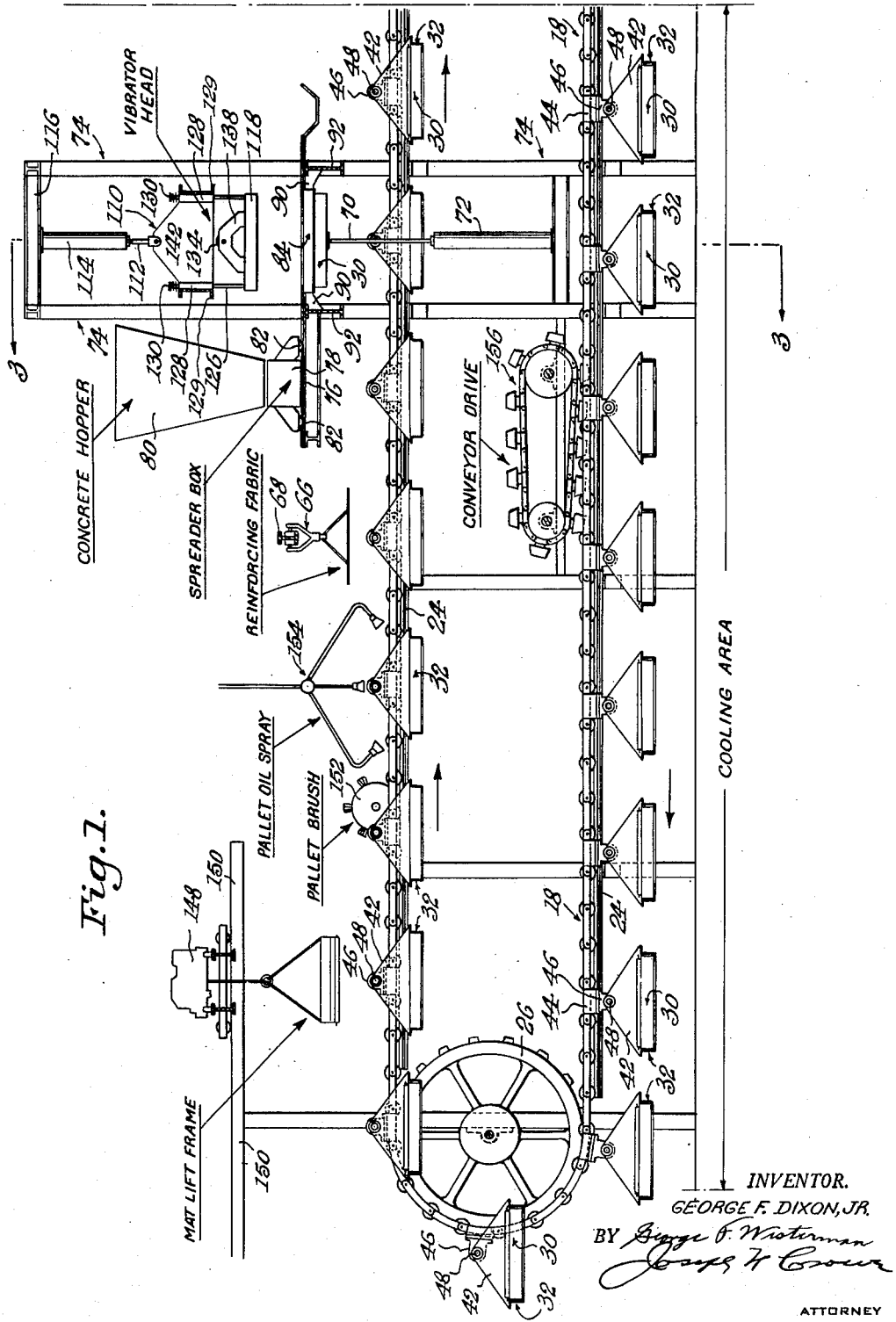
Figure 2:
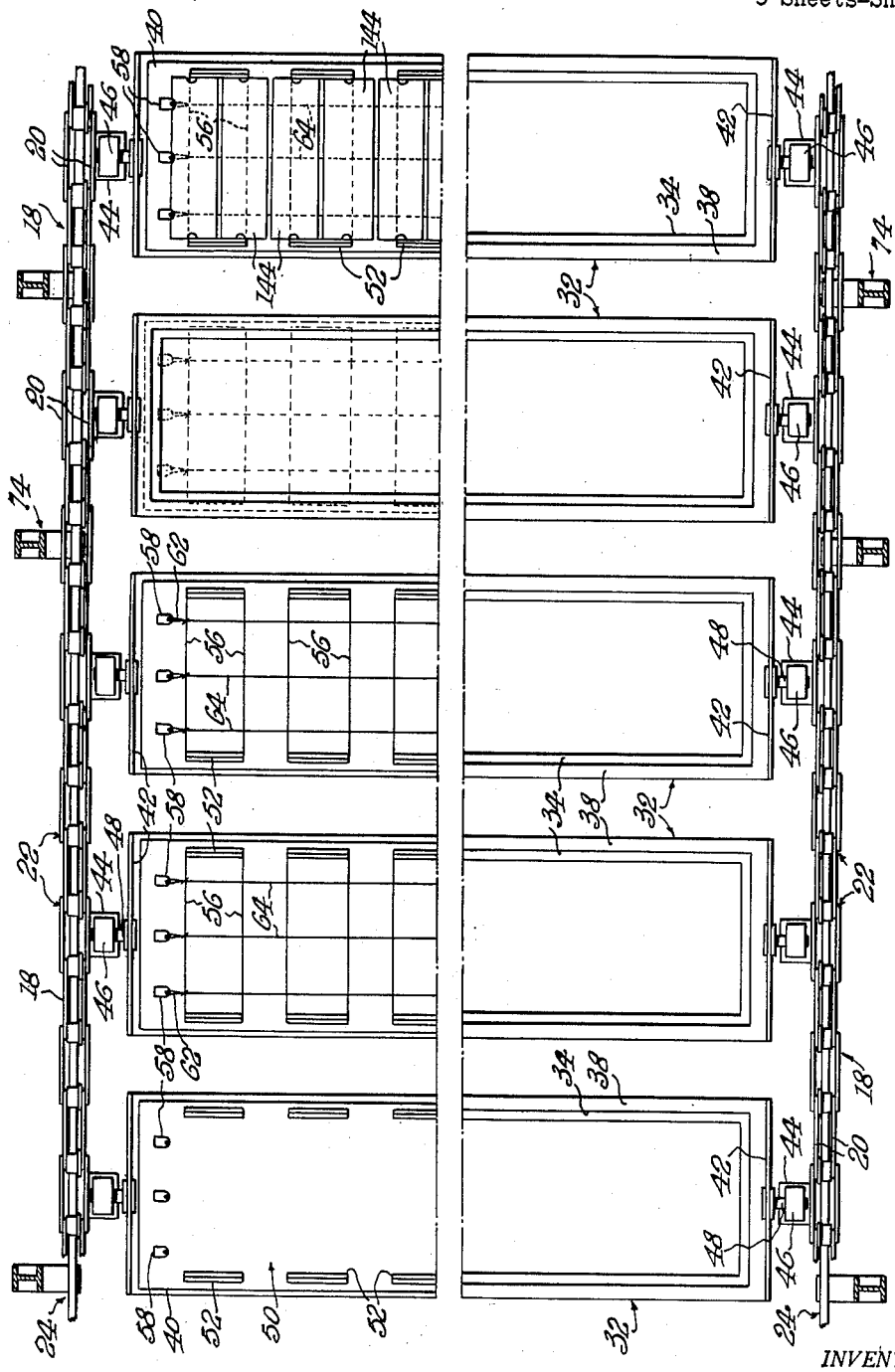

Referring more particularly to the drawings, the present improved equipment includes a power-operated endless dual closed link with roller type conveyor 18 having spaced parallel links 20 flexibly interconnected by pivot connections 22 and mounted on a track framework 24, the conveyors 18 having vertically aligned upper and lower reaches passing around guide wheels 26, 28 at the ends of the courses of the conveyors. The space between the dual conveyors is substantially equal to the length of the revetment mat square, this space being spanned by the equally spaced steel pallets 30, which are of sufficient size to carry the revetment mat squares being manufactured, these pallets being suspended from the dual conveyor 18 at 4½ foot intervals. The carrying means for the pallets include frames 32 having a peripheral bottom flange 34 which forms a seat for the bottom periphery 36 of the pallets, and peripheral top flange 38 which forms a seat for the top flange 40 of the pallets, the pallet-carrying frames 32 being connected to the conveyors by suspension plates 42 pivotally connected to corresponding opposed conveyor links 20 intermediate adjacent pivots 22, the connection being made through brackets 44 welded to the conveyor links and projecting inwardly therefrom, the brackets 44 carrying bearings 46 for pivotal connections 48. In practice, the pallets 30 are mounted freely in the frames 32, the top surface 50 of the pallets being substantially planar except for oppositely disposed side cleats 52 around which pass loops 54 of parallel endless strands 56 of the reinforcing fabric, which strands 56 tie together in pairs adjacent slabs of the mat squares. The top planar surface 50 of the pallets also are provided with equally spaced end cleats 58 provided with upstanding lugs 60 for receiving end loops 62 of the strands 64 of the reinforcing fabric which extend longitudinally through each mat square for flexibly interconnecting together the longitudinal sides of contiguous slabs of the mat square. Each of the reinforcing fabrics is positioned on the successive pallets by a crane indicated diagrammatically by 66 which is movable along a trolley beam 68 extending at right angles to the conveyors 18, as is indicated at Fig. 1. The crane 66 positions the reinforcing fabric on each successive pallet, as has been described above.

The conveyors 18 then move the pallets with the reinforcing fabric positioned thereon to the molding station, where each pallet is lifted from its carrying frame by means of vertically acting lifting pistons 70 operating in cylinders 72 supported by an auxiliary frame 74 located at the molding station.

The molding station also includes overhead tracks 76 on which is mounted a spreader box 78 which receives concrete from a concrete supply hopper 80, the spreader box 78 being mounted on rollers 82, the spreader box 78 being movable along tracks 76 between a position beneath the supply hopper 80 and the mold box 48 which is mounted fixedly on the support frame 74, and which will be referred to, in greater detail hereinafter. The spreader box 78 is designed to spread the concrete throughout the mold box after the pallet has been raised to concrete-receiving position relative to the mold box 84, the pallet defining the bottom of the mold box during the concrete-molding operation, a suitable number of lifting cylinders and pistons being provided for lifting each pallet directly vertically from its frame, and when the pallet has received the concrete, directly lowering it without tilting or shifting until the loaded pallet again seats into its carrying frame. The pallet carrying frames are provided with open bottoms for receiving the heads of the pistons 70. In practice, equally spaced, simultaneously acting pistons are provided for raising and lowering the said pallets. The spreader box 78 is coextensive in length with the pallets, and its moves transversely across the mold box for filling the latter with concrete, the spreader box screeding off the concrete in the filled mold box when the spreader box is retracted to its starting position.

The mold box 84 has neither top nor bottom, the pallets defining the mold box bottom when they are raised to molding position. The mold box is composed of longitudinal side bars 86 and ends 88, the mold box being mounted on bracket arms 90 extending from and welded to lateral I-beams 92 of the auxiliary frame structure 74. The side bars 86 of the mold box are provided with recesses 94 which correspond to the lateral cleats 52 of the pallets 30 over which cleats the recesses 94 are adapted to fit. The ends 88 of the mold frames are provided with recesses 96 which are adapted to receive and to fit over end cleats 58 on the pallets 30. It will be noted that the reinforcing fabric when positioned on these side and end cleats is spaced upwardly from the planar surface 50 of the pallets so that this reinforcing fabric will be located approximately centrally of the mat square.

The mold box is divided interiorly into mold frames by partitions 98, the spacing between which corresponds to the width of the individual slabs making up a complete mat square, the thickness of these partitions corresponding to the spacing between contiguous slabs. The partitions 98 extend transversely across the mold box and interconnect the side bars 86 thereof, and are provided with bottom notches 100 that correspond to the longitudinal strands 64 of the reinforcing fabric, and are of a depth sufficient to receive these strands. The side bars 86 are provided with inwardly projecting scarfs 102 midway between the partitions 98, which scarfs 102 form recesses 104 in the butt ends of the slabs, the scarfs 102 being tapered inwardly as shown, while end scarfs 106 on the ends 88 of the end mold frames are approximately semicircular in shape for forming rounded recesses 108 in the outer sides of the terminal slabs of the mat, which provide access to end loops 62 of longitudinally extending reinforcing strands 64 of the reinforcing fabric.

It has been stated above that one of the improved results obtained by the present equipment is a low water-to-concrete ratio, and in practice it is found that the water content can be held to 4½ gallons per sack of cement, and that the cement content of the concrete aggregate can be reduced to approximately 2.9 sacks per square of mat composed of twenty individual slabs of the dimensions noted above by way of example. There is found to be satisfactory an aggregate mix in the ratio (by weight) of 1:4.4:6.4 mix with one-inch maximum aggregate size. The low water-to-cement ratio means that the mix is not substantially more than sensibly moist to the touch, the consistency of the water-to-cement mixture being such that it will "ball up" when a sample is compressingly squeezed in the hand. Therefore, after the concrete has been introduced into the mold box and leveled by movements of the spreader box over the mold box, it is found in practice that the density of the spread concrete in the mold box may be modified to a desirable extent by application thereto of mechanical compression which is provided by a vibrator head, indicated at 110 on Fig. 1, and the structure of which is shown in fragmentary detail by the perspective view of Fig. 10. The vibrator head 110 is suspended from a suitable number of spaced pistons 112 operating in hydraulic cylinders 114 suspended from cross-beams 116 at the top of the auxiliary frame structure 74, the suspension mounting for the vibrator head 110 enabling the head to be lowered and raised between an operative position on the concrete in the mold box and an inoperative position elevated above the mold box as shown in Fig. 1.

The vibrator head 110 is substantially coextensive in over-all dimensions with the interior of the mold box, and it comprises a series of hollow steel slabs or shells 118 which correspond in number and dimensions to the subdivisions in the mold box which form the individual slabs of the mat square. Since these steel slabs 118 are designed to nest snugly in each frame of the mold box, each of the slabs is provided with opposite end recesses 120 which correspond to the tapering end scarfs 102 of the mold box compartments, and the terminal slabs are provided along the outer sides thereof with semi-circular recesses 122, which correspond to the semi-circular end scarfs 106 of the mold box. The successive steel slabs 118 are spaced apart as is indicated at 124 by an amount corresponding to the thickness of the transverse partitions 98 in the mold box.

The hollow vibratory steel slabs 118 are suspended by hanger bars 126, one of which extends through each slab at each corner thereof, and upwardly through guides 128 which tie the rods (and steel slabs) to the vibrator head. The hanger bars 126 terminate in enlarged heads 130, coil springs 132 being interposed between the bar heads 130 and the top flange of guides 128, for permitting vertical vibratory motion of the steel slabs 118, which vibratory motion is initiated by a suitable motor 134, there being one for each of the steel slabs 118, each motor 134 being mounted on a shaft 136 extending through corresponding pairs of bracket arms 138 which are welded or otherwise secured to each slab 118 laterally thereof.

Figure 3:
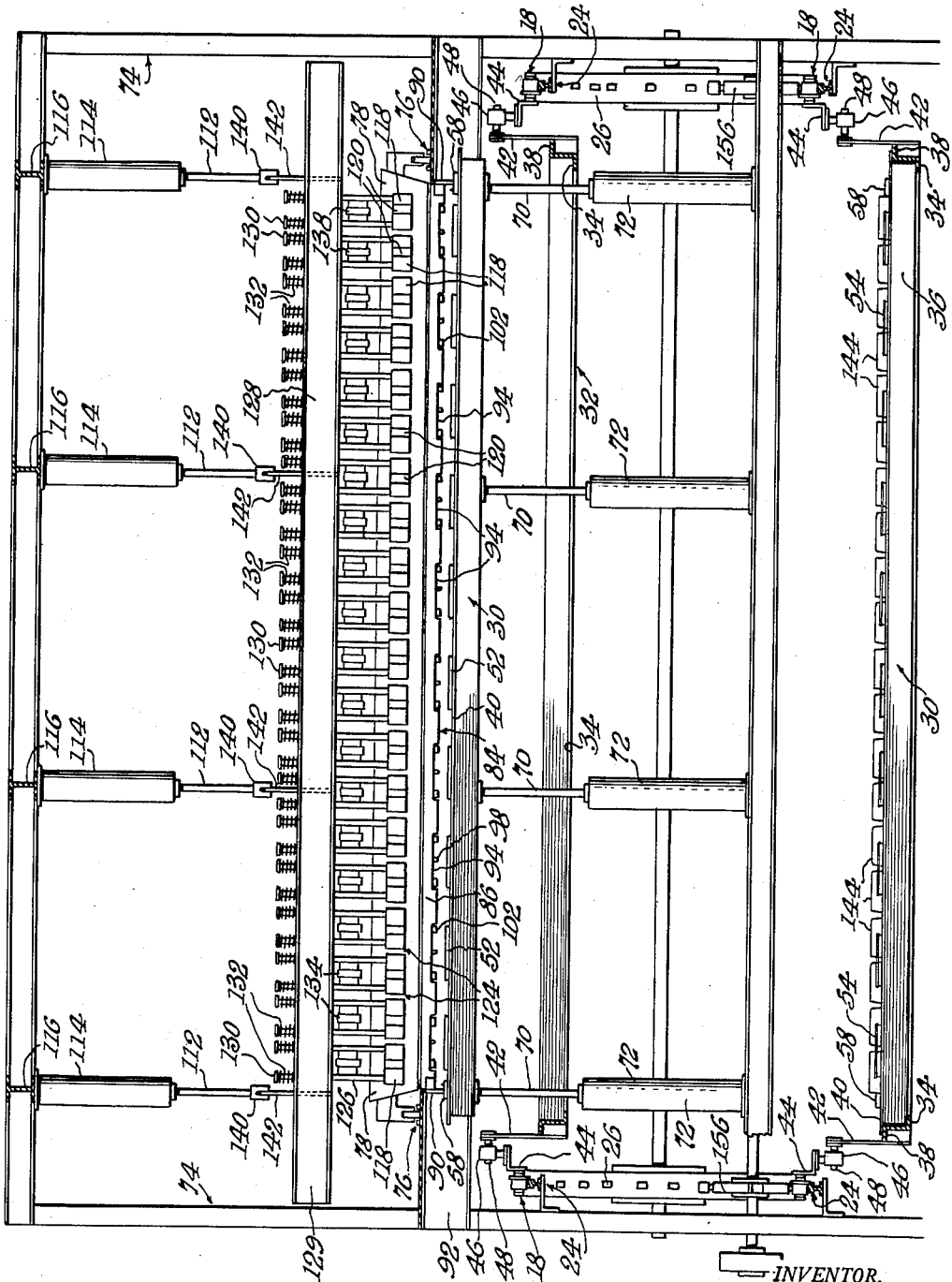

It has been pointed out above that the vibrator head is suspended from a suitable number of pistons 112 operating in hydraulic cylinders 114. By way of illustration, there are shown four of such in Fig. 3, although this number may be varied in different installations. The heads 140 of the pistons 112 are secured to hanger plates 142 which are welded to the webs of the channels 129, so that when the vibrator head 110 is lowered into engagement with the concrete in the mold box, each of the steel slabs 118 of the vibrator head will fit into its corresponding section or mold frame of the mold box, with end recesses 120 of the successive slabs 118 receiving corresponding end scarfs 102 of the mold box, and terminal recesses 122 of the vibrator head receiving terminal scarfs 106 of the terminal mold frames. This means, therefore, that the weight of the vibrator head effects a compaction of the concrete in the mold box sufficiently to permit each of the slabs 118 of the vibrator head to nest into the mold box at the top thereof and compacts the concrete sufficiently to enable entry of the mold box scarfs into these recesses, with partitions 98 in the mold box registering with and entering the space 124 between adjacent slabs. The resulting vibratory action on the concrete in the mold box produces a requisite density in the concrete for development of a sufficient early strength to enable the mat squares to be handled.

After the vibratory treatment has been completed, pressure is exerted by piston 112 on the vibrating head to force the mat out of the bottom of the mold box. Simultaneously, with the exertion of the pressure by the vibrating head, the pallet carrying the molded mat square is released from the mold box by lowering pistons 70 into their cylinders 72, thereby lowering the pallet 30 with the concrete mat square thereon until the pallet seats within its frame 32. The vibrator head is then raised by retracting pistons 112 into their cylinders 114. The conveyor is actuated and each succeeding pallet in its frame is brought to the molding station, where the above procedure is repeated for each of the pallets, so that for each complete travel of the conveyor through a complete course, there will be molded as many mat squares as there are pallets carried by the conveyor. Since the reinforcing fabric is applied to the pallet cleats with a space between the fabric and the planar top surface of each pallet, the fabric will be embedded in each slab 144 of the mat square approximately midway between the top and bottom surfaces of the slab or mat square, as will be seen from Fig. 3, for example.

Following the molding station, the pallets carrying the molded mat squares are conveyed through a heating and curing area 146, which in practice is a steam tunnel where optimum curing temperature and humidity are maintained. The length of the tunnel is such as to provide optimum time of steam curing of the mats with a section of the tunnel external of the heating and curing area providing a cooling area, the length of the cooling area being determined by the optimum time required to reduce the temperature of the mats from that acquired in the steam tunnel to the temperature at which it is to be exposed to atmospheric temperature. After passing through the cooling area, the mats are brought successively to the unloading station where they are removed from their respective pallets by means of a gantry-type crane 148, operating on overhead trackage 150. The unloaded pallets then pass to a clearing station where they are cleaned successively by rotating brush means 152, and after the cleaning, the pallets are subjected to oil sprays from spraying means 154, these oil sprays oiling the pallet before the reinforcing fabric is placed upon it, as has been described above.

As the mats are removed from the pallets, they are stacked on wooden pallets in tiers, fifteen mats high which then are transported to storage by available equipment.

It will be understood from the foregoing description that the sequence of operations of the improved equipment is as follows:

The various parts of the plant are positioned as shown in Figs. 1 and 1a of the drawings. The endless oval-shaped dual conveyor from which the steel pallets 30 are suspended like seats on a ferris wheel, moves a distance of 4½ feet at a stated interval by means of mechanical driving units 156, the time interval being that time required to raise the pallets from the frame 32 to a position directly beneath the mold box, fill the mold box with concrete, screed and vibrate the concrete, and lower the mat from its position in the mold box to its position on the conveyor. As the conveyor moves, a steel pallet 30, which always remains on the conveyor, except for that time when it is moved up to form the bottom of the mold box, passes the rotary brush means where the pallet is cleaned, then in the next position the pallet receives the oil sprays at the spraying station 154. Then the reinforcing fabric is placed on the pallet by means of overhead conveyor 66, after which the pallet is conveyed to the molding station and in position immediately beneath the mold box. As the pallet reaches this position, it is raised off the conveyor by the pallet lift comprising the pistons 70 operating in cylinders 72, which pistons press the pallet firmly against the underside of the mold box and hold it in this position to form the bottom of the mold box during the molding and vibration of the concrete. Simultaneously, the concrete spreader box 78, which has been filled with concrete from the concrete hopper 80 immediately above it, moves out over the mold box, filling the mold box with concrete and spreading the concrete to a precise level in the mold box. When the spreading action has been completed, the vibrating head 110 is lowered onto the concrete in the mold box, and each of the individual concrete slabs making up the one mat is vibrated for a stated interval. Pressure is then exerted on the vibrating head to force the mat out through the bottom of the mold box as the pallet which has been held against the bottom of the mold box is lowered. The pallet with the freshly molded concrete mat resting on it, is lowered into position on the conveyor. The elapsed time from the time that the pallet holding only the fabric is lifted off the conveyor until the time that it returns to its position on the conveyor with the mat upon it, controls the speed of the operation and production of the plant. After the pallet holding the concrete mat comes to rest on the conveyor, it is conveyed into the steam tunnel where the mat is cured until it develops sufficient strength to permit its being lifted from its pallet by the crane 148 when the pallet and mat are moved to the lifting station for the mat.

From the foregoing description, it will be apparent that the equipment herein described effects a very substantial increase in the rate of production of concrete revetment mats composed of reinforced and flexibly interconnected individual slabs. The equipment is capable of substantial variations in details of construction and operation without departing from the spirit of the invention; and it will be understood, therefore, that it is intended and desired to embrace within the scope of the invention such modifications and changes as may be necessary or desirable to adapt it to varying conditions and uses, as defined by the appended claims.

What I claim as new and desire to secure by Letters Patent is:

1. Apparatus for producing flexible revetment mats composed of flexibly interconnected individual concrete slabs, which comprises, in combination, conveyor means, a plurality of stations consecutively arranged along the path of travel of said conveyor and in cooperating relation therewith including pallet preparing stations and a molding station, including a mold box, mat curing means following said molding station, mechanism for progressively moving the conveyor means through said plurality of stations and said curing means, pallet carrying means secured to the conveyor means at spaced intervals, a pallet removably mounted in each of the pallet-carrying means, said pallet having upstanding portions on a planar surface thereof to support slab reinforcing fabric a predetermined distance therefrom, means for raising and lowering said pallet between said pallet carrying means and said mold box to form a bottom therefor when each of said pallet carrying means is moved to said molding station, and pivotally-acting suspension means interconnecting the pallet-carrying means to the conveyor means, and freely suspending the pallet-carrying means from the conveyor means in a vertical plane throughout the entire course of travel of the conveyor means.

2. Apparatus for producing flexible revetment mats composed of flexibly interconnected individual concrete slabs, which comprises, in combination, conveyor means, pallet carrying frames secured at spaced intervals to said conveyor means, each of said frames supporting a removable pallet, each said pallet having upstanding portions on a planar surface thereof for supporting flexible reinforcing fabric a predetermined distance therefrom, a plurality of pallet preparing stations and a station for applying flexible reinforcing fabric to successive pallets, a molding station including a mold box constructed and arranged to mold a complete concrete revetment mat on successive pallets, means for curing complete mats following said molding station, mechanism for progressively advancing the conveyor means through said plurality of pallet preparing stations, flexible reinforcing fabric station, molding station and curing means, said pallet carrying frames having open tops and open bottoms, an internal bottom flange extending inwardly from end and side walls of the pallet frames adjacent to the bottom thereof, and extending peripherally around the open bottom of each pallet frame, a top flange on each pallet frame extending peripherally around the frame and extending outwardly from end and side walls thereof, each said pallet being nested in its frame with its bottom portions resting on the internal bottom flange of its frame and having a top peripheral flange extending outwardly from the pallet for seating on the top flange of each frame, means for raising and lowering a pallet between a pallet carrier frame and said mold box end suspension plates for each of the frames, and pivotal connections freely interconnecting the suspension plates to the conveyor means for vertically suspending the pallet carrying frames and pallets therein from the conveyor means throughout the entire course of travel of the conveyor means.

3. Apparatus for producing flexible revetment mats composed of flexibly interconnected individual concrete slabs, which comprises, in combination, conveyor means, a series of pallet carrying frames freely suspended from the conveyor, a pallet removably mounted in each frame, spaced end and side cleats on the pallets for receiving and retaining loops of reinforcing flexible fabric for the mat, the end cleats being at directly opposed positions on opposite end portions of the pallet and the side cleats being at directly opposed positions on opposite sides of the pallet, mat curing means, and driving mechanism for the conveyor means for moving the conveyor and pallet carrying frames and the pallets therein progressively through a series of stations arranged along said conveyor in cooperating relation therewith including pallet preparing stations, a reinforcing fabric applying station provided with mechanism for applying the reinforcing fabric to the cleats on each pallet, a molding station including mechanism for casting a complete revetment mat on each pallet around and inclosing the reinforcing fabric and mat curing means said molding station also including a mold box, and means for raising and lowering a pallet between a pallet carrier frame and said mold box.

4. Apparatus for producing flexible revetment mats composed of flexibly interconnected individual concrete slabs, which comprises, in combination, conveyor means, a plurality of equi-spaced pallet assemblies carried by the conveyor means, each of the pallet assemblies including a pallet carrying frame and a pallet removably mounted, each of said pallets having cleats located on a planar surface thereof for supporting reinforcing fabric for strengthening individual cast mats and flexibly interconnecting the indivdiual slabs of a complete revetment mat, each said frame having dimensions enabling a complete revetment mat to be placed thereon, means pivotally interconnecting the pallet assemblies with the conveyor means and including pivot connections freely suspending the pallet assemblies in a vertical plane throughout the entire course of travel of the conveyor means, the pallet carrying frames having open tops and open bottoms with pallets nested therein, a molding station through which the conveyor passes including a stationary mold box having an open top and an open bottom and corresponding in size to a complete revetment mat, partition members in the mold box corresponding to and delimiting the individual slabs of the complete revetment mat, means for raising and lowering a pallet between the pallet frame and the mold box, said pallet forming a closed bottom for the mold when in raised position, means operable responsively to engagement of the pallet with the mold box for filling the mold box with concrete and leveling the concrete throughout the mold box, a vibratory head normally positioned above the mold box and including spaced slabs corresponding to the individual slabs of the revetment mat, means for vibrating each of the said slabs, means for lowering the vibratory head into engagement with the concrete in the mold box with each slab of the head engaging the corresponding molded slab of the revetment mat, and means for returning the vibratory head to starting position when the cast revetment mat has been released from the mold box onto its pallet, and driving mechanism for the conveyor means.

5. Apparatus for producing flexible revetment mats comprising flexibly interconnected individual concrete slabs which comprises, in combination, dual conveyor means, a support framework for said conveyor means, means carried by said support framework in mutually spaced relation for cooperating rotational engagement with said dual conveyor means for maintaining the upper and lower reaches of said dual conveyor means in vertically aligned parallel relation, structural means enclosing a portion of the length of said dual conveyor means and constituting a curing environment, a first auxiliary framework located adjacent an end of said dual conveyor means remote from said curing environment, a second auxiliary framework vertically arranged and located intermediate the ends of said support framework and attached thereto, a concrete mat molding station including a mold box having an open top and bottom mounted on said second auxiliary framework, a plurality of equally spaced pallet assemblies carried by the dual conveyor means, each of the pallet assemblies including a pallet carrying frame and a pallet removably mounted, each frame having dimensions enabling a complete revetment mat to be cast thereon, means for raising and lowering a pallet between the pallet frame and the mold box, a plurality of stations including a pallet cleaning station, a pallet lubricating station and a station including means for depositing reinforcing members on said removably mounted pallets arranged immediately in advance of said molding station and in alignment therewith, said curing environment directly following said molding station and aligned therewith, drive mechanism engaging said dual conveyor means for progressively advancing said pallet assemblies through said plurality of stations, mat casting station and said curing environment.

6. Apparatus as recited in claim 5 wherein said first auxiliary framework supports a mat lifting means for transferring completed mats from said dual conveyor means to a storage area.

References Cited in the file of this patent

UNITED STATES PATENTS

| | | |
|---|---|---|
| 1,602,172 | Ruby | Oct. 5, 1926 |
| 1,835,914 | Stockdale | Dec. 8, 1931 |
| 1,956,967 | Upson | May 1, 1934 |
| 2,341,012 | Billman et al. | Feb. 8, 1944 |
| 2,569,231 | Danhof | Sept. 25, 1951 |